United States Patent [19]
Bogrand, IV et al.

[11] Patent Number: 5,547,126
[45] Date of Patent: Aug. 20, 1996

[54] RING ANGLE THERMALLY RESPONSIVE EXPANSION VALVE

[75] Inventors: George E. Bogrand, IV, North Prairie; Andrew A. Kenny, Sussex; Francois O. Rosaz, Milwaukee, all of Wis.

[73] Assignee: Eaton Corporation, Cleveland, Ohio

[21] Appl. No.: 558,924

[22] Filed: Nov. 13, 1995

Related U.S. Application Data

[63] Continuation of Ser. No. 312,335, Sep. 26, 1994, abandoned.
[51] Int. Cl.⁶ .................................................. G05D 27/00
[52] U.S. Cl. .............................................. 236/92 B; 62/225
[58] Field of Search ............................. 236/92 B; 62/225

[56] References Cited

U.S. PATENT DOCUMENTS

| | | | |
|---|---|---|---|
| 3,537,645 | 11/1970 | Treder | 236/92 B |
| 3,822,563 | 7/1974 | Orth | 236/92 B X |
| 4,342,421 | 8/1982 | Widdowson | 62/225 X |
| 4,542,852 | 9/1985 | Orth et al. | 62/225 X |
| 5,297,728 | 3/1994 | Yano et al. | 236/92 B |
| 5,303,864 | 4/1994 | Hirota | 236/92 B |

*Primary Examiner*—William E. Tapolcai
*Attorney, Agent, or Firm*—Roger A. Johnston

[57] ABSTRACT

A right angle thermally responsive expansion valve having an integrally formed valve actuator rod with an enlarged head contacted by a pressure responsive diaphragm and the rod is guided for sliding movement in the valve body. The actuator rod has a reduced diameter end which contacts a valve member for effecting opening of the valve. The reduced diameter end is sealed by a seal ring between the rod and the body.

2 Claims, 3 Drawing Sheets

5,547,126

1

RING ANGLE THERMALLY RESPONSIVE EXPANSION VALVE

This application is a continuation, of application Ser. No. 08/312,335, filed Sep. 26, 1994, now abandoned.

BACKGROUND OF THE INVENTION

The present invention relates to expansion valves of the type responsive to a thermally generated fluid pressure signal for controlling flow through the valve and is particularly suitable for controlling flow of refrigerant from the condenser to the evaporator in a refrigeration or air conditioning system. In particular, in automotive air conditioning systems it has been found desirable in certain vehicle installations to utilize a valve having a right angle configuration between the inlet and the outlet for facilitating installation in the system conduits.

A known right angle expansion valve arrangement for controlling refrigerant flow employs a fluid pressure capsule which has a pressure responsive diaphragm therein and which is attached to the valve block with a capillary tube communicating a fluid pressure signal from a thermal sensor to one side of the diaphragm. The opposite side of the diaphragm has a pad or plate registered thereagainst for contacting a plurality of push rods which, in response to the integrated force of the pressure acting on the diaphragm, are operable to effect movement of a moveable valve member for controlling flow from the valve inlet to the outlet. One known configuration for such a valve is shown in FIG. 2 where the valve body 1 has an inlet fitting 2 which has a passage 3 therein which communicates with a valving passage 4 which has a valve seat 5 with a valve member in the form of ball 6 seated thereagainst for controlling flow to an outlet passage 7 in an outlet fitting 8 which is disposed at generally right angles to the fitting 2. The valve member is retained against the valve seat 5 by a retainer 9 which is biased in the direction to seat the check ball by one end of a coil spring 10 which has its opposite end retained by a ring 11 which is threaded into the passage 7 for adjusting the spring preload on the member 9.

A plurality of push rods, one of which is shown and denoted by reference numeral 12, are disposed about the passage 4 with the lower end of each push rod contacting the retainer 9. The upper end of each push rod is registered against a pad or plate 13 which is moved by a pressure responsive diaphragm 14 which is sealed by weldment about its periphery in the capsule 15. The capsule is connected to a capillary tube 16 for receiving a thermally generated fluid pressure signal therethrough which varies the pressure in chamber 17 as applied to the upper surface of diaphragm 14 for controlling movement of the push rods 12. A pressure equalization passage shown in dashed outline and denoted by reference numeral 18 provides pressure equalization from the outlet passage 7 to the undersurface of the diaphragm 14.

In certain refrigeration applications having a relatively high pressure drop across the evaporator, for example, a pressure drop of seventy psi (483 KPa) it has been found desirable to employ an externally equalized expansion valve where the underside of the pressure responsive diaphragm is connected through a passage in the valve block to an external capillary connected to the evaporator outlet. This has been accomplished by rerouting passage 18 to connect with an external pressure equalization passage denoted by reference numeral 19.

Heretofore, the known valve of FIG. 2 has been fabricated with the body 1 formed of brass material with the pad 13,

2 diaphragm and push rods 12 formed as separate pieces; as, are the valve member 6 and retainer 9. The valve of FIG. 2 has the disadvantage of relatively high manufacturing costs in high volume mass production as is required for automotive air conditioning applications. Thus, it has been desired to find a way or means of improving the construction and reducing the manufacturing costs of the known right angle refrigerant expansion valves.

SUMMARY OF THE INVENTION

It is an object of the present invention to provide an easy to manufacture and low in cost a thermally responsive expansion valve having a right angle configuration between the inlet and outlet.

It is a further object of the present invention to provide a right angle thermal expansion valve suitable for controlling refrigerant flow in response to a thermally generated fluid pressure signal and which has a minimum of parts and simplified assembly.

The present invention provides an expansion valve operable in response to a thermally generated fluid pressure signal acting on one side of a diaphragm in a pressure capsule to actuate a push rod which has a reduced diameter portion sealed from the inlet pressure to effect movement of a valve member in the valving chamber. The push rod has an integrally formed enlarged head portion integrally formed thereon which is registered against the side of the diaphragm opposite the fluid pressure signal. The valve member has a semi spherical surface and acts against a valve seat provided in the valving passage between the valve inlet and outlet which are disposed at right angles for convenience of installation. The valve member is biased to the closed position by a conically tapered coil spring which has the remote end thereof registered against a washer staked in the valve outlet.

In one embodiment the valve is internally pressure equalized by a passage connecting the valve outlet with the side of the diaphragm opposite the fluid pressure signal. In another embodiment, the side of the diaphragm opposite the fluid pressure signal is connected via a passage to an external port for connection to a fluid pressure signal, typically provided through a capillary connected to the refrigerant evaporator outlet. The present invention preferably employs an aluminum valve body formed from an extruded aluminum bar with a corrosion resistant valve member and provides for reduced manufacturing costs and ease of assembly.

DETAILED DESCRIPTION

Figure 1:
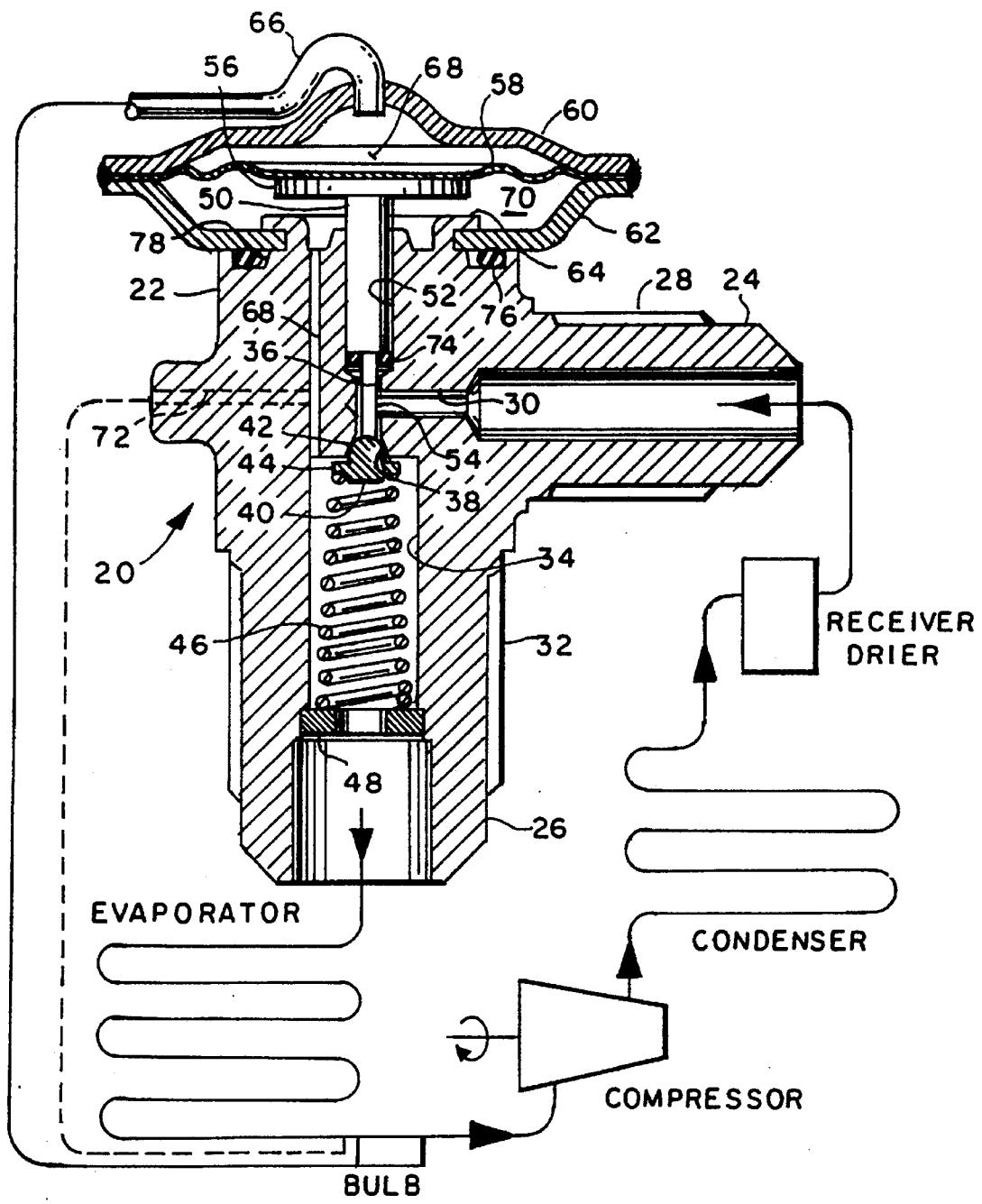
FIG. 1 is a cross-section of the valve of the present invention.
Figure 2:
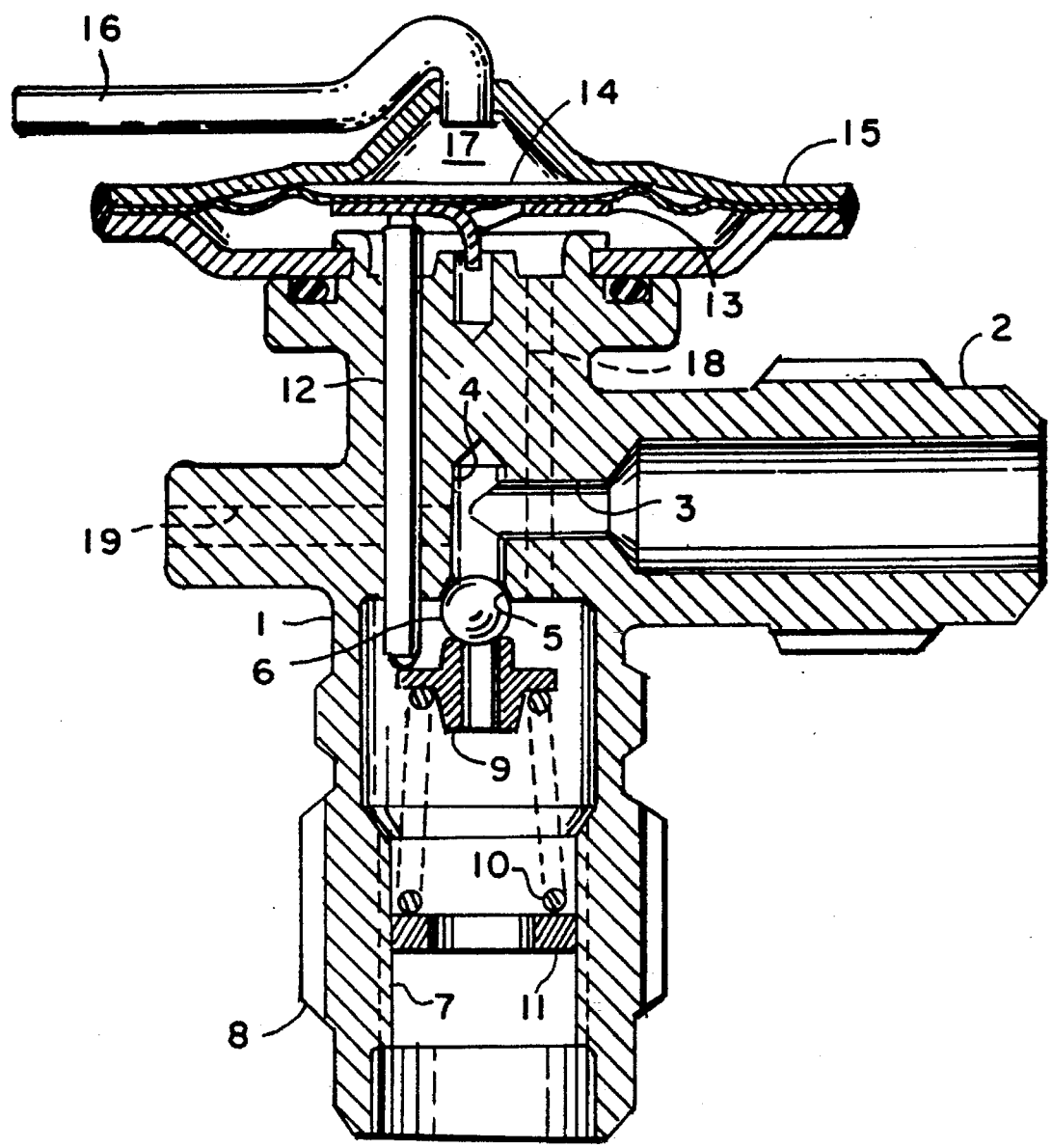
FIG. 2 is a cross-section of a prior art valve.

Referring to FIG. 1, the valve assembly of the present invention is indicated generally at 20 and the assembly has a valve body 22 preferably formed of aluminum material which may be conveniently cut from a bar extruded to the right angle shape of the valve port arrangement. The body 22 has an inlet fitting 24 and an outlet fitting 26 which are preferably disposed at right angles to each other. Inlet fitting 24 is threaded externally at 28 for connection thereto and has formed therein an inlet passage 30. Outlet fitting 26 is externally threaded at 32 and has a passage 34 formed therein. The inlet passage 30 communicates with a cross or valving passage 36 which intersects the valve seat 38 and which communicates with the outlet passage 34.

A moveable valve member 40 has a preferably semi-spherical valving surface denoted by reference numeral 42 which contacts the valve seat 38 in the closed position. Valve member 40 has a radially outwardly extending annular flange 44 against which is registered one end of a bias means 46 preferably comprising a tapered coil spring. The opposite end of the bias means 46 is registered against and retained by the washer 48 which is secured in the passage 34 preferably by staking of the body metal thereover. Valve member 40 is preferably formed of corrosion resistant steel.

A valve actuating means 50 comprising a push rod is slidably received in a guide bore 52 provided in the body. The push rod 50 has a reduced diameter pin portion 54 which extends through valving passage 36 to contact the semi-spherical surface 42 of the valve member. The upper end of the valve actuating means 50 is configured in an enlarged diameter flange 56 which is registered against the underside of a pressure responsive diaphragm 58. The flange 56, rod 50 and pin 54 are preferably formed integrally as a one piece member. The diaphragm 58 is secured, preferably by weldment about its periphery, to a capsule housing comprising upper and lower shells 60, 62.

The lower shell 62 is secured to the body 22 by an annular flange 64 formed by orbital staking over the inner periphery of the shell 62. It will be understood that the lower shell 62 of the capsule is sealed on the block by a suitable seal ring 76 received in a groove 78 formed in the body adjacent the shell 62.

The upper shell 60 has a fluid pressure signal capillary 66 attached thereto which communicates with the chamber 68 formed above the diaphragm by shell 60. It will be understood that capillary 66 is adapted for connection to a fluid filled bulb or capillary coil which senses the temperature of the fluid to be controlled. In a refrigerant application, typically, the capillary bulb (not shown) would be attached to the evaporator discharge line for sensing the temperature of the refrigerant discharging from the evaporator.

Referring to FIG. 1, an internal pressure equalization passage 68 is shown in solid outline in the block 22 having its upper end communicating with the chamber 70 formed by shell 62 on the underside of the diaphragm and the lower end communicating with outlet passage 34. It will be understood however that external pressure equalization may be accomplished in another embodiment by providing the passage 72 shown in dashed outline as communicating with passage 68 and eliminating the connection of passage 68 to the outlet passage 34. In the embodiment employing the passage 72, an external capillary (not shown) is connected to the passage 72 for providing a fluid pressure signal from the evaporator outlet to the passage 72. This technique is well known in the art of refrigerant expansion valves has external pressure equalization.

The reduced diameter portion or pin 54 of the valve actuator means 50 is sealed in the guide bore 52 by a suitable resilient seal ring denoted by reference numeral 74.

Figure 3:
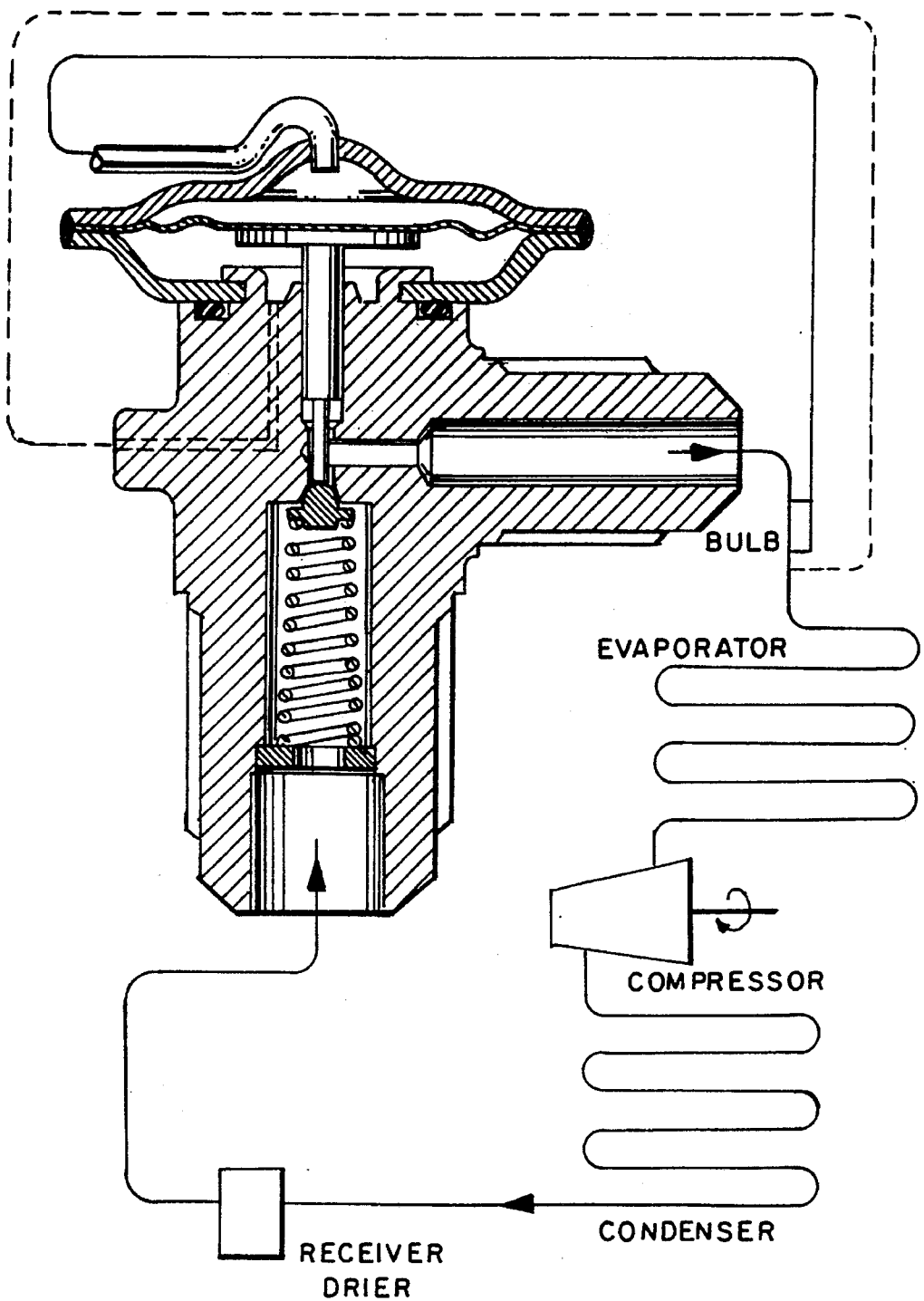
FIG. 3 is a cross-section of another embodiment of FIG. 1.

Referring to FIG. 3, the present invention can also be applied to a reverse flow application. In order to achieve a reverse flow configuration, the valve assembly of FIG. 1 would be modified in the following manner: the resilient seal ring (denoted by reference numeral 74 in FIG. 1) would not be necessary, and the communicating passage (denoted by reference numeral 68 in FIG. 1) would be moved so that it would be connecting chamber 70 (FIG. 1) and passage 30 (FIG. 1). In the reverse flow configuration, passage 34 of FIG. 1 would become the inlet passage and passage 30 of FIG. 1 would become the outlet passage.

The present invention thus provides a right angle thermally responsive expansion valve which has an integrally formed actuator means comprising a push rod having an enlarged flange contacted by the pressure responsive diaphragm which effects movement of the rod slidably guided in the body and which has a reduced diameter portion or pin on the end thereof for contacting the valve member and moving the valve member from the seat for controlling flow from the high pressure inlet to the outlet. The reduced diameter portion is sealed in the valve body by a resilient seal ring provided in the guide bore. The valve member is biased to the closed position by a spring which is retained in the valve body by a washer suitably staked therein.

Although the invention has hereinabove been described with respect to the illustrated embodiments, it will be understood that the invention is capable of modification and variation and is limited only by the scope of the following claims.

We claim:

1. A thermally responsive expansion valve comprising:
   (a) a body member defining an inlet port adapted for connection to a source of fluid at a relatively high pressure and an outlet port for discharging fluid at a substantially reduced pressure at right angles to said inlet port; said inlet and outlet ports connected by a valving passage having a valve seat formed therein;
   (b) a valve member disposed in said passage and moveable between a closed position contacting and an open position spaced from said valve seat for controlling flow to said outlet port at a reduced pressure;
   (c) means biasing said valve member toward said closed position;
   (d) valve actuator means comprising an elongated member guided for sliding movement in said body and having a portion of reduced transverse dimension with the end of said reduced portion extending through said valving passage on the inlet pressure side of side valve seat operable for contacting said valve member, said actuator means including a head portion of enlarged transverse dimension distal said reduced portion, said head portion extending externally of said body member;
   (e) a fluid filled pressure capsule attached to said body member, said capsule having a pressure responsive diaphragm forming a portion of the wall thereof, with said diaphragm contacting said head portion of said actuator means,
   (f) sealing means located in said body member for moveably sealing between said reduced portion and said body, said sealing means isolating said diaphragm from said inlet pressure;
   (g) a fluid pressure signal conduit communicating with one side of said pressure responsive diaphragm for providing a fluid pressure signal thereto, wherein said pressure responsive diaphragm is operative in response to pressure changes in said capsule to move said valve actuator means and effect movement of said valve member between said closed position and said open position; and,
   (h) said body member defining a pressure equalization passage communicating the pressure in said outlet with the side of said diaphragm opposite said one side.

2. The expansion valve defined in claim 1, wherein said valve actuator means has said elongated member head portion and reduced portion formed integrally in one piece.

* * * * *